US008929100B2

(12) United States Patent
Sumi et al.

(10) Patent No.: US 8,929,100 B2
(45) Date of Patent: Jan. 6, 2015

(54) POWER CONVERTER ENABLING SUPPRESSION OF MAGNETIC FLUX BIAS IN A TRANSFORMER OF THE CONVERTER

(75) Inventors: Takashi Sumi, Nishio (JP); Hiroyuki Sakakibara, Hekinan (JP); Yuji Hayashi, Kasugai (JP)

(73) Assignee: Denso Corporation, Kariya (JP)

( * ) Notice: Subject to any disclaimer, the term of this patent is extended or adjusted under 35 U.S.C. 154(b) by 184 days.

(21) Appl. No.: 13/604,997

(22) Filed: Sep. 6, 2012

(65) Prior Publication Data

US 2013/0063983 A1    Mar. 14, 2013

(30) Foreign Application Priority Data

Sep. 12, 2011 (JP) ................. 2011-198635

(51) Int. Cl.
*H02M 3/335* (2006.01)
*H02M 1/40* (2007.01)
*H02M 3/337* (2006.01)

(52) U.S. Cl.
CPC .............. *H02M 1/40* (2013.01); *H02M 3/3376* (2013.01)
USPC .......................................... 363/17

(58) Field of Classification Search
USPC ............ 363/16–20, 34, 37, 41, 56.02, 97, 98, 363/56.12
See application file for complete search history.

(56) References Cited

U.S. PATENT DOCUMENTS

| 4,748,550 | A | * | 5/1988 | Okado | 363/98 |
| 5,081,570 | A | * | 1/1992 | Chibani et al. | 363/17 |
| 6,400,580 | B1 | * | 6/2002 | Bowman et al. | 363/17 |
| 7,813,148 | B2 | * | 10/2010 | Zeng et al. | 363/17 |

FOREIGN PATENT DOCUMENTS

| JP | 3615004 | 11/2004 |
| JP | 2005-51991 | 2/2005 |

* cited by examiner

*Primary Examiner* — Rajnikant Patel
(74) *Attorney, Agent, or Firm* — Nixon & Vanderhye PC

(57) ABSTRACT

In an electrical power converter, an input circuit performs switching for converting a supply voltage of a power source to alternating-polarity voltage pulses which are applied to the primary winding of a transformer. Each voltage pulse is controlled (e.g., pulse width or amplitude is adjusted) based on a detected value of current flow in the primary winding, where the value has been detected an even-numbered plurality of voltage pulses previously. Any DC component of current flow in the primary winding, caused by manufacturing deviations between switching elements in the input circuit, can thereby be suppressed, and DC flux bias in the transformer thereby suppressed.

8 Claims, 4 Drawing Sheets

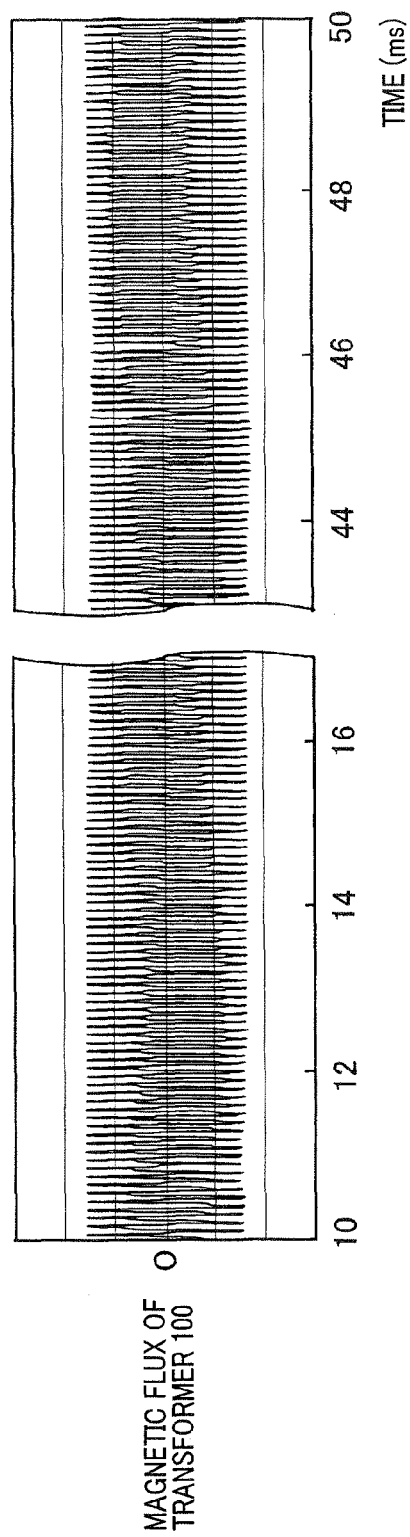

POWER CONVERTER ENABLING SUPPRESSION OF MAGNETIC FLUX BIAS IN A TRANSFORMER OF THE CONVERTER

CROSS-REFERENCE TO RELATED APPLICATIONS

This application is based on and incorporates herein by reference Japanese Patent Application No. 2011-198635 filed on Sep. 12, 2011.

BACKGROUND OF THE INVENTION

1. Field of Application

The present invention relates to an electrical power conversion apparatus which incorporates a transformer, such as a DC-DC converter which converts an input DC voltage to a different value of DC voltage.

2. Background Technology

An electric power converter which operates as a DC-DC converter is described for example in Japanese patent No. 3615004, referred to in the following as document D1. The power converter of document D1, e.g., as shown in FIG. 2 thereof, includes a transformer having primary and secondary windings, a converter circuit which receives a DC supply voltage from a main battery, a rectification and smoothing circuit, and a control circuit. The output DC voltage from the apparatus is supplied to charge a secondary battery. The converter circuit includes high-side and low-side switching elements, which are controlled by signals from the control circuit to apply alternating-polarity voltage pulses to the primary winding of the transformer, as an AC input voltage. A stepped-down AC voltage is thereby produced from the secondary winding of the transformer due to AC current flow in the primary winding, and is converted to the output DC voltage by the rectification and smoothing circuit. The control circuit controls the voltage pulses applies to the primary winding (e.g., by adjusting the pulse width) in accordance with the output DC voltage.

A problem which arises with such a type of circuit is that, if there are deviations between the operating characteristics of certain circuit elements in the input circuit such as semiconductor switching devices, due to manufacturing variations, the AC current flowing in the primary winding of the transformer may contain a DC component which is superimposed on the AC current. A DC flux bias will thereby be produced in the magnet flux of the transformer. If the current contains a positive-polarity DC component for example, then each positive-polarity current pulse is increased in amplitude by the value of the DC component, while similarly each negative-polarity current pulse is decreased in amplitude by the same amount.

It would be possible to suppress such a DC component by applying suitable negative-feedback current control. That is, in the case of a positive-polarity DC component occurring for example, each positive-polarity voltage pulse could be determined (e.g., pulse width or amplitude decreased) based on a precedingly detected value of positive-polarity current and each negative-polarity voltage pulse correspondingly determined based on a precedingly detected value of negative-polarity current flow. The effect of the DC component in producing a DC flux bias could thereby be gradually suppressed.

However when digital control is applied, the following problem arises with the prior art. In general, each voltage pulse applied to the primary winding is determined based on a value of current flow in the primary winding which was detected during the immediately preceding voltage pulse. In that case, again assuming a positive-polarity DC component, each positive-polarity voltage pulse will be controlled based on a preceding negative-polarity current pulse, and each negative-polarity voltage pulse will be controlled based on a preceding positive-polarity current pulse. When feedback control is performed in such a condition, the DC component of the primary winding current (and hence the DC flux bias) will become increased rather than decreased.

SUMMARY

Hence it is desired to overcome the above problem, by providing a power converter apparatus incorporating a transformer, wherein when a DC magnetic flux bias arises in the transformer due to effects of manufacturing variations of circuit elements in the apparatus, the flux bias becomes suppressed.

From a first aspect the disclosure provides a power converter apparatus which executes a conversion operation on electrical power supplied from a DC power source, and supplies the resultant converted electrical power to a load. The apparatus includes a first conversion circuit which is controlled for converting an output DC voltage of the DC power source to an AC voltage (series of alternating-polarity voltage pulses) which is applied to a primary winding of the transformer. The apparatus further includes a control circuit which obtains a detected value of current flow in the primary winding during each of the voltage pulses, and also obtains successive values indicating the level of converted electrical power that is being supplied from the apparatus. The control circuit controls the voltage pulses (e.g., adjusts the width or amplitude of each pulse) based upon the detected values of current and the indicated level of converted electrical power. More specifically, the voltage pulses are controlled such as to maintain the indicated level of converted electrical power at a command value of power. The command value of power may be expressed as a command value of output voltage that is to be applied to the load.

The apparatus is characterized in that each voltage pulse is controlled based upon a value of current flow in the primary winding which was detected an even-numbered plurality of voltage pulses previously.

As a result, when a DC component arises in the current which flows in the primary winding of the transformer, feedback control of the voltage pulses can suppress the DC component. For example in the case of a positive-polarity DC component, each positive-polarity voltage pulse is controlled based on a level of primary winding current which flowed during a preceding positive-polarity voltage pulse, while similarly each negative-polarity voltage pulse is controlled based on a level of primary winding current during a preceding negative-polarity voltage pulse. A DC flux bias in the transformer can thereby be suppressed.

To effect such feedback control, the control circuit is preferably configured to compare the indicated level of converted electrical power (e.g., expressed as a detected value of output voltage supplied to the load) with a command value indicating a required level of converted electrical power (e.g., a command value of the output voltage supplied to the load), to obtain a command value of current based on a result of the comparison, and for controlling the voltage pulses based upon results of comparing the detected values of current flow in the primary winding with the command value of current.

From another aspect, the values of current flow in the primary winding are preferably detected as respective values of current flow between the power source and the first conversion circuit.

The power converter apparatus may constitute a DC-to-DC converter, incorporating a second conversion circuit which is connected between the secondary winding and the load. The second conversion circuit converts an AC voltage produced from the secondary winding to an output DC voltage, which is supplied to the load.

BRIEF DESCRIPTION OF THE DRAWINGS

FIG. 4 is a waveform diagram illustrating suppression of a magnetic flux of the transformer of the embodiment.

DESCRIPTION OF PREFERRED EMBODIMENTS

Figure 1:
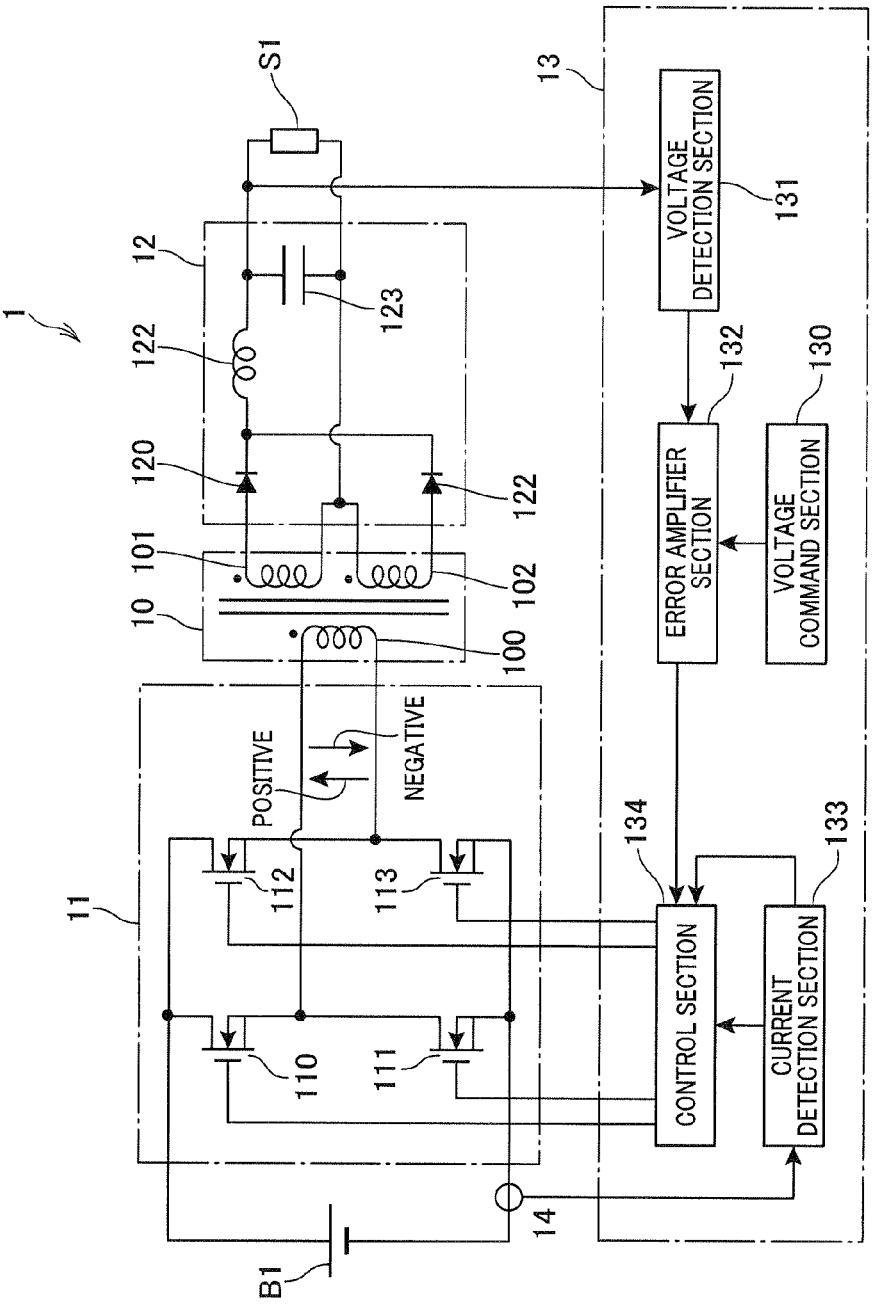
FIG. 1 is a circuit diagram of an embodiment of a power converter apparatus.

FIG. 1 shows an embodiment of a power converter apparatus which is a DC-to-DC converter designated by reference numeral 1, for installation in a motor vehicle. The embodiment provides a high-voltage DC supply that is insulated from the vehicle battery, by using a transformer and rectification to convert the battery voltage to a stepped-down DC voltage.

In FIG. 1, each of the dot indications at the windings of a transformer 10 indicates the start of a corresponding winding of the transformer. The arrow symbols at the primary winding indicate the polarities of voltage pulses applied to that winding.

The DC-to-DC converter 1 is a full-bridge type of converter which converts the voltage of a battery B1, serving as a DC power source, to an output DC voltage that is supplied to an electronic apparatus S1 which is installed in the vehicle, while insulating the electronic apparatus S1 from the battery B1. As shown, the DC-to-DC converter 1 includes an input-side circuit 11, a transformer 10 having a primary winding 100 and a pair of secondary windings 101, 102, an output-side circuit 12, and a control circuit 13.

The transformer 10 performs step-down of an AC voltage applied to its primary winding 100, producing a stepped-down AC voltage from the secondary windings 101, 102. Each of the secondary windings 101, 102 has a smaller number of turns than the primary winding 100.

The input-side circuit 11 is connected between the output-side circuit 12 and the battery B1, and serves to convert the DC voltage of the battery B1 to an AC voltage (alternating-polarity voltage pulses) that is applied to the primary winding 100. In the input-side circuit 11, four FETs (field-effect transistors) 110~113 operate as respective switching devices for converting the DC voltage of the battery B1 to the AC voltage that is applied to the primary winding 100. The FETs 110 and 111 are connected in series, as are the FETs 112, 113. Specifically, the source terminals of the FETs 110, 112 are respectively connected to the drain terminals of the FETs 111, 113, and the two series-connected pairs of FETs 110, 111 and 112, 113 are connected in parallel to the battery B1. The drain terminals of the FETs 110, 112 are respectively connected to the positive-polarity terminal of the battery B1, and the source terminals of the FETs 111, 113 are connected respectively to the negative-polarity terminal of the battery B1.

The output-side circuit 12 is a rectification and smoothing circuit which converts the output AC voltage from the transformer 10 to the output DC voltage. The output-side circuit 12 includes diodes 120, 121, an inductor 122 and capacitor 123. The anodes of the diodes 120, 121 are respectively connected to the starting end of the secondary winding 101 and to the final end of the secondary winding 102, while the cathodes of the diodes 120, 121 are connected in common via the inductor 122 to the positive-polarity terminal of the electronic apparatus S1.

One terminal of the capacitor 123 is connected to the end of the inductor 122 which is connected to the positive-polarity terminal of the electronic apparatus S1. The other terminal of capacitor 123 is connected to the junction of the secondary windings 101, 102 and to the negative-polarity terminal of the electronic apparatus S1.

The control circuit 13 controls the input-side circuit 11 such as to maintain the output DC voltage from the output-side circuit 12 at a command value of voltage. Specifically, the control circuit 13 determines respective pulse widths of the alternating positive-polarity and negative-polarity voltage pulses that are applied to the primary winding 100, by controlling switching timings of the FETs 110~113. The control circuit 13 thereby determines values of current flow in the primary winding 100.

The width of each voltage pulse is determined based upon the value of output DC voltage produced from the output-side circuit 12 and upon a value of current which flowed in the primary winding 100 during a voltage pulse which occurred two voltage pulses periods previously. The control circuit 13 includes five circuit blocks, respectively designated as a voltage command section 130, a voltage detection section 131, an error amplifier section 132, a current detection section 133 and a control section 134.

The voltage command section 130 produces a voltage command signal expressing a command value of the output DC voltage from the output-side circuit 12. The voltage command signal is inputted to the error amplifier section 132, together with a voltage detection signal which is produced from the voltage detection section 131 and which expresses the value of output DC voltage being produced from the output-side circuit 12.

The error amplifier section 132 obtains the difference between each detected value of output DC voltage and the command value of voltage, amplifies the difference amount (i.e., feedback error quantity), and derives a command value of current based on the amplified difference amount. The command value of current is expressed by a current command signal which is supplied to the control section 134 from the error amplifier section 132. Specifically, the error amplifier section 132 generates the current command signal based on proportional integration of successive amounts of difference between the voltage values detected by the voltage detection section 131 and the command voltage value.

The current detection section 133 receives a sensing signal from a current sensor 14, for producing a current detection signal that is supplied to the control section 134. The current detection signal expresses the level of input current which is being supplied to the input-side circuit 11 from the battery B1, i.e., which is being transferred to the primary winding 100 via the FETs 110 and 113 or via the FETs 111 and 112. Based on that current detection signal, the control section 134 obtains detected current values corresponding to respective time points as described hereinafter.

The control section 134 applies control signals to the respective gates of the FETs 110~113. The control section 134 thereby controls the alternating-polarity voltage pulses which are applied to the primary winding 100, by controlling switching of the FETs 110 to 113 based on differences between the detected current values and the command value of current. More specifically, prior to commencement of each voltage pulse, the control section 134 determines the width that is to be set for that voltage pulse, based on the difference between the command value of current at that time (that command value having been updated during the preceding voltage pulse) and a value of current flow in the primary winding which had been detected two voltage pulses previously.

Figure 2:
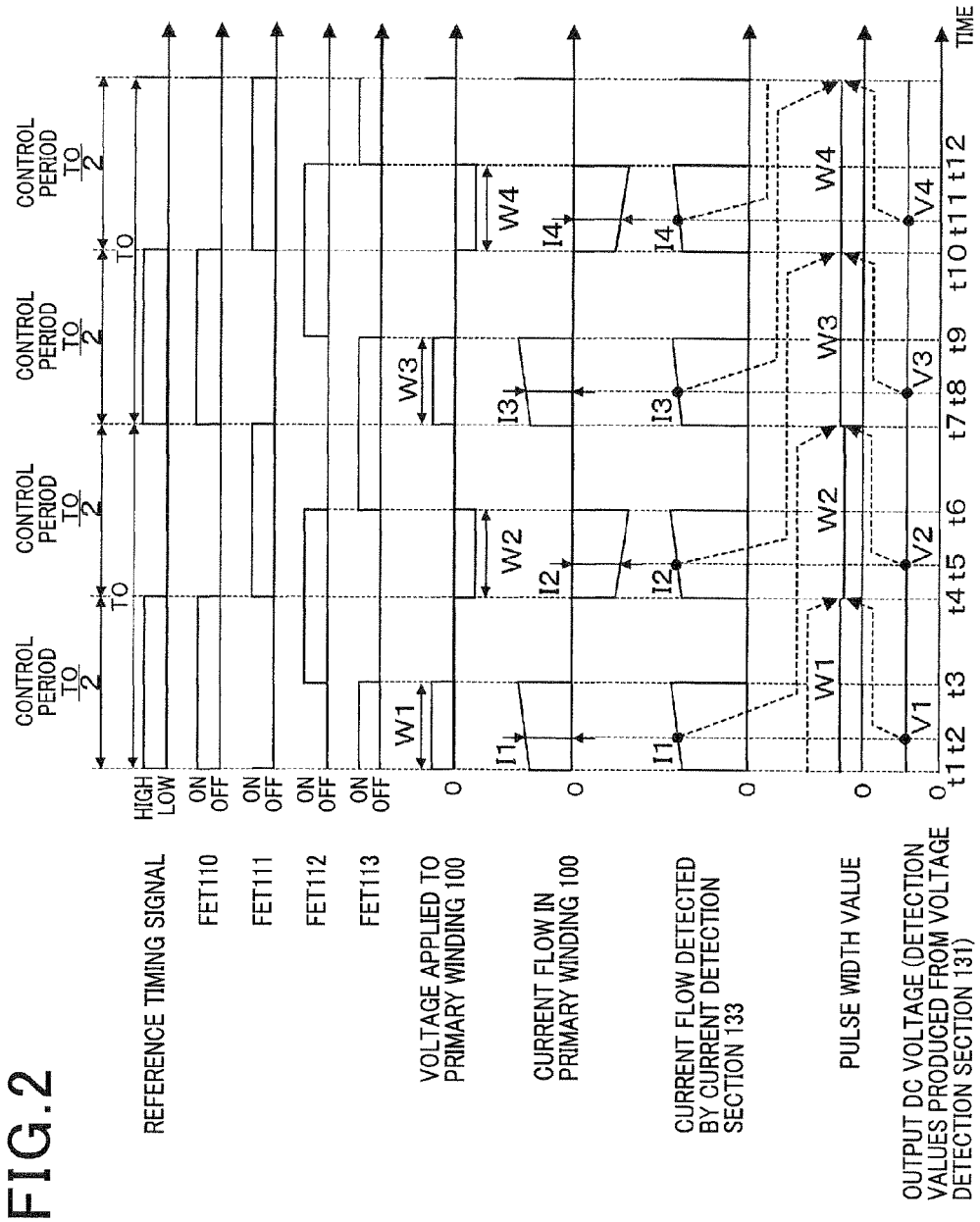
FIG. 2 is a timing diagram for describing the operation of the embodiment when a current flowing in a primary winding of a transformer does not contain a DC component.
Figure 3:
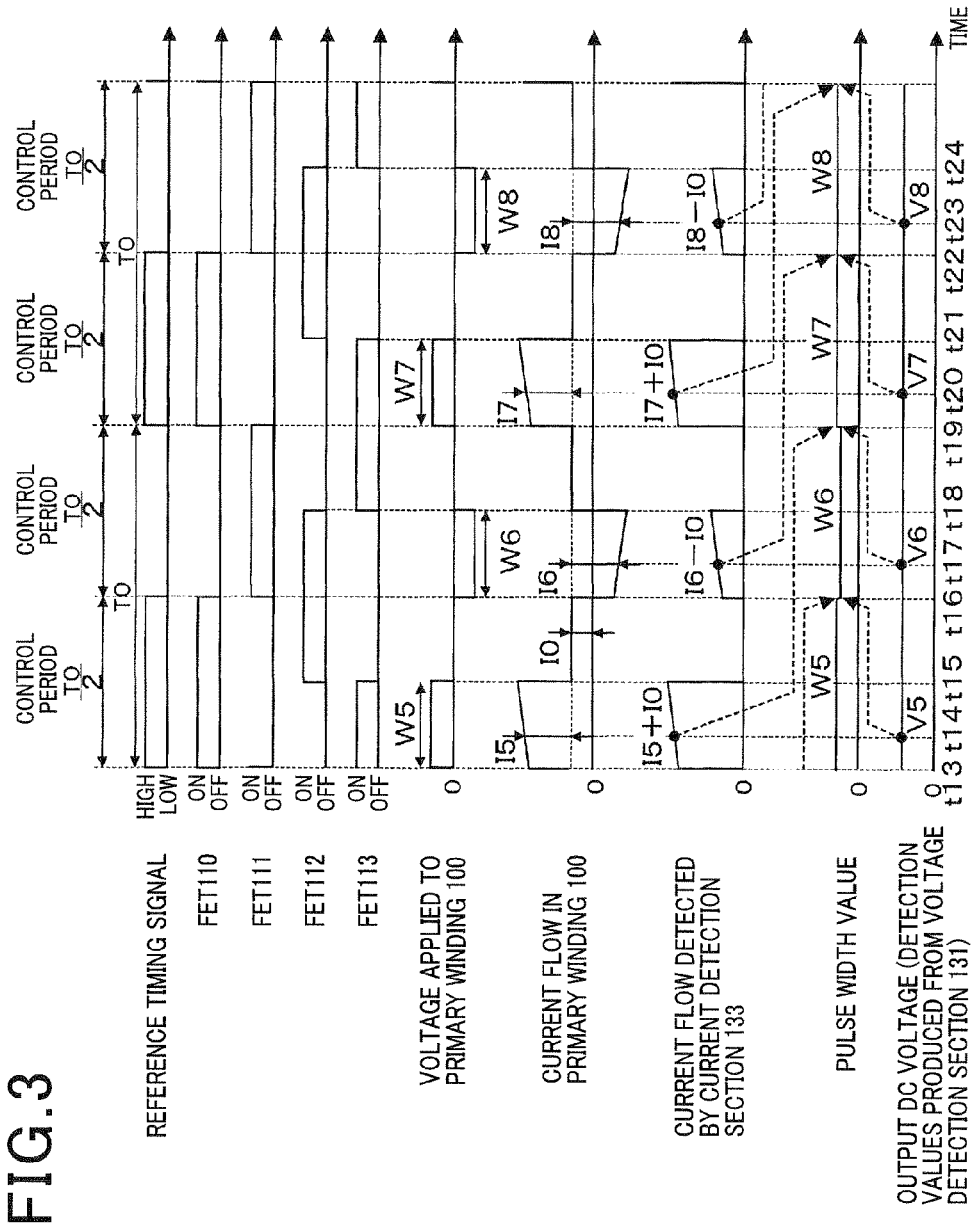
FIG. 3 is a timing diagram for describing the operation of the embodiment when the current flowing in the primary winding contains a positive DC component.

The operation of the DC-to-DC converter 1 will be described in more detail referring to the timing diagrams of FIGS. 2 and 3. FIG. 2 illustrates the operation when the current flowing in the primary winding 100 does not contain a DC component, while the timing diagram of FIG. 3 illustrates the case in which the current contains a positive-polarity DC component.

As shown in FIG. 2, the control section 134 performs on/off switching of the FETs 110, 111 in synchronism with a reference timing signal having a duty ratio of 50% and a period T0 (with each half-period Tr/2 being referred to as a control period). The on-state (conducting-state) intervals of the FETs 110, 111 are mutually inverted in phase, occurring in successive control periods. Switching of the FETs 112, 113 is similarly performed, in synchronism with a second timing signal, obtained by phase-displacement of the reference timing signal by a variable amount. That amount of phase displacement determines the relative phase widths of the positive-polarity voltage pulses and negative-polarity voltage pulses applied to the primary winding 100. As indicated by the arrow symbols in FIG. 1, one direction of current flow through the primary winding 100 is designated as the positive-polarity direction and the opposite direction as the negative-polarity direction.

During the interval t1-t3 the FETs 110 and 113 are each set in the on state, i.e., a positive-polarity voltage pulse having pulse width W1 is applied, causing a positive-polarity flow of current in the primary winding 100. During the interval t4-t6 the FETs 111 and 112 are each set in the on state, so that a negative-polarity voltage pulse having pulse width W2 is applied, causing a negative-polarity flow of current in the primary winding 100. Similarly, during the interval t7-t9 a positive-polarity voltage pulse having pulse width W3 causes a positive-polarity flow of current, and during the interval t10-t12 a negative-polarity voltage pulse having pulse width W4 causes a negative-polarity flow of current in the primary winding 100.

Alternating-polarity voltage pulses are thereby applied to the primary winding 100 as an AC voltage. A stepped-down AC voltage is outputted from the secondary windings 101, 102, which is rectified and smoothed in the output-side circuit 12 and supplied to the electronic apparatus S1 as the output DC voltage.

In the example of FIG. 2, detected current values (I1, I2, I3, I4, . . . ) are derived by the current detection section 133 at respective time points (t2, t5, t8, t11, . . . ) during the voltage pulses having respective pulse widths W1, W2, W3, W4. Each of these time points is predetermined as being delayed with respect to the start of the corresponding voltage pulse by an amount that is a fixed fraction of the pulse width. Thus for example the interval from t1 to t2 could be set as ⅓ of the interval from t1 to t3.

The pulse width of each voltage pulse is determined by the control section 134 based upon the difference between a detected current value which was detected two voltage pulses previously and the command value of current which was updated during the preceding voltage pulse (i.e., updated in accordance with a value of output DC voltage which was detected by the voltage detection section 131 during the preceding voltage pulse). For example, the pulse width W3 of the positive-polarity voltage pulse which commences at time point t7 is determined based on the difference between a value of primary winding current (I1) which was detected at time point t2 and a command value of current which was updated in accordance with a voltage value detected at time point t5. Thus the detected current value (I1) was detected during a voltage pulse which occurred two voltage pulses previously.

Similarly at time point t10, the control section 134 determines the pulse width W4 of a negative-polarity voltage pulse based on a value of primary winding current (I2) which was detected at time point t5 and a command value of current which was updated in accordance with an output DC voltage value detected at time point t8.

However if there are deviations between the characteristics of the FETs 110~113, the AC current that flows in the primary winding 100 may contain a DC component. A DC flux bias will thereby be produced in the primary winding 100.

This is illustrated by the timing diagram of FIG. 3, which shows an example of the operation of the embodiment when the AC voltage applied to the primary winding 100 contains a positive-polarity DC component, designated as 10. Here, the pulse width W7 is determined at time point t19 based upon the output DC voltage from the output-side circuit 12 at time point t17 and a value of current flow in the primary winding 100 at time point t14. Thus the width of the positive-polarity voltage pulse that commences at time point t19 is determined based on a value of positive-polarity current (I5+I0) which was detected two voltage pulses previously and which was increased by an amount equal to the positive-polarity DC component.

Similarly, the pulse width W8 is determined at time point t22 based upon the output DC voltage from the output-side circuit 12 at time point t20 and a value of current flow in the primary winding 100 at time point t17. Thus the width of the negative-polarity voltage pulse that commences at time point t22 is determined based on a value of negative-polarity current (I6-I0) which was detected two voltage pulses previously and which was decreased by an amount equal to the positive-polarity DC component.

This continues until finally the DC current component becomes suppressed, and the DC flux bias in the transformer 10 is thereby suppressed.

FIG. 4 shows an example of variation of the magnetic flux of the transformer 10, when there are deviations between characteristics of the FETs 110~113 and these deviations would otherwise produce a DC flux bias. FIG. 4 illustrates how the DC flux bias is suppressed by the operation of the embodiment.

The effects obtained by the above embodiment are summarized in the following.

Firstly, with the above embodiment, the width of each positive-polarity voltage pulse (applied to the primary winding 100 of the transformer 10) is determined based on a precedingly detected value of positive-polarity current flow in the primary winding 100. Similarly, the width of each negative-polarity voltage pulse is determined based on a precedingly detected negative-polarity current flow in the primary winding 100. This enables suppression of a DC flux bias of the transformer 10 which could result from deviations between the characteristics of the FETs 110~113.

Furthermore with the above embodiment, the control circuit 13 determines a command value of current based on a result of comparing a detected value of output DC voltage from the output-side circuit 12 with a command value of that voltage, and determines the width of each voltage pulse based on a result of comparing a detected value of current flow in the primary winding 100 with the command value of current. Hence, the widths of the voltage pulses applied to the primary winding 100 are reliably determined based on detected values of output DC voltage and detected values of current flow in the primary winding 100.

Furthermore with the above embodiment, the control circuit 13 derives values of current flow in the primary winding 100 based on detected values of current supplied to the input-side circuit 11 from the DC power source (battery B1), i.e., current which passes to the primary winding 100. Hence the values of current flow in the primary winding 100 can be reliably detected.

With the above embodiment, the width of each voltage pulse applied to the primary winding 100 is determined based on a value of current flowing in the primary winding 100 which was detected at a time point occurring two voltage pulses previously. However it should be noted that the invention is not limited to this, and it would be equally possible to utilize a value of current which was detected at a time point which occurred four voltage pulses previously. The essential requirement is that the current be detected during a voltage pulse which occurred an even number of voltage pulses previously. If that number is made greater than 2, the detection delay (i.e., delay between the time of detecting the current and the time at which the detected value is to be applied in determining a voltage pulse width) will be increased accordingly. Hence there may be a lower speed of control response with respect to changes in current flowing in the primary winding 100. However this lowering of the control response speed can be avoided by lowering the gain of the current feedback control.

With the above embodiment, the output-side circuit 12 converts the AC voltage from the secondary winding of a transformer to a DC voltage which is supplied to a load. However it would be equally possible to apply the invention to a power converter apparatus in which an output circuit converts the AC voltage applied to the primary winding of a transformer to a different frequency of AC voltage.

Furthermore with the above embodiment, proportional integral (PI) control is applied based on differences between detected values of output DC voltage and a command value of voltage, for determining a command value of current, and control of voltage pulses applied to the transformer primary winding is executed based on differences between detected values of current flow in the primary winding and the command value of current. However it is not essential to apply proportional integral control, and it would for example be equally possible to apply proportional integral derivative (PID) control.

Furthermore with the above embodiment, control of voltage pulses applied to the primary winding 100 is performed by the control circuit 13 through variation of the pulse width of fixed-amplitude voltage pulses. However it would be possible to achieve the same effect by amplitude variation of fixed-width voltage pulses, or by variation of the time-axis density of fixed-width fixed-amplitude voltage pulses.

Furthermore with the above embodiment, the AC voltage applied to the primary winding 100 is obtained by conversion of a DC voltage from a DC power source. However it would be equally possible for the AC voltage applied to the primary winding of the transformer to be derived by conversion of the frequency or amplitude of a different AC voltage.

Furthermore with the above embodiment, a predetermined output DC voltage from the power converter apparatus is supplied to an electronic apparatus. However the invention would for example be applicable to a power converter apparatus which supplies power at a predetermined DC voltage for charging a secondary battery.

Furthermore with the above embodiment, the input-side circuit 11 is controlled based upon (in conjunction with the detected values of current flow in the primary winding 100) the value of output DC voltage supplied from the output-side circuit 12 to an electrical load. Assuming that the load is substantially resistive, the detected DC voltage value is indicative of the value of converted electrical power being supplied to the load, in which case the command value of voltage can be considered to constitute a command value of converted output electrical power. The invention could equally be applied to a power converter apparatus in which the AC voltage output from the secondary winding of the transformer is supplied directly to a load, with only DC-to-AC power conversion being performed. For example the output power from the apparatus might be supplied to an apparatus which generates heat, such as an induction heating apparatus. In that case it would be possible to control the input-side circuit based upon detected values of temperature, as detected values which are indicative of the level of converted electrical power being supplied from the power converter apparatus to the load. A command value of temperature would be utilized in place of the command value of DC voltage of the above embodiment.

What is claimed is:

1. A power converter apparatus for executing a conversion operation on electrical power supplied from an electrical power source and for supplying resultant converted electrical power to a load, the apparatus comprising
    a transformer having a primary winding and a secondary winding,
    a first conversion circuit connected between said electrical power source and said primary winding, said first conversion circuit configured to be controllable for converting an output voltage of said electrical power source to an AC voltage comprising alternating-polarity voltage pulses, and for applying said AC voltage to said primary winding, and
    a control circuit configured for detecting a value of current flow in said primary winding during each of said voltage pulses, for detecting successive values indicative of said converted electrical power, and for controlling said first conversion circuit to determine said voltage pulses based upon said detected values of current and upon said detected values indicative of converted electrical power;
    wherein said control circuit determines each of said voltage pulses based upon a value of current flow in said primary winding detected during a specific preceding voltage pulse, said specific preceding voltage pulse having occurred an even-numbered plurality of voltage pulses previously.

2. The power converter apparatus according to claim 1, wherein said control circuit is configured for comparing each of said detected values indicative of converted electrical power with a command value indicative of a required level of converted electrical power, to obtain a command value of current based on a result of said comparison, and for controlling said voltage pulses based upon results of comparing said detected values of current flow in said primary winding with said command value of current.

3. The power converter apparatus according to claim 1, wherein said control circuit performs pulse width control or pulse amplitude control of said voltage pulses.

4. The power converter apparatus according to claim 1, wherein said values of current flow in said primary winding are detected as respective values of current flow between said power source and said first conversion circuit.

5. The power converter apparatus according to claim 1, wherein said electrical power source comprises a DC power source supplying a DC voltage to said first conversion circuit.

6. The power converter apparatus according to claim 1, comprising a second conversion circuit connected between said secondary winding and said load, said second conversion circuit configured for converting an AC voltage produced from said secondary winding to an output DC voltage and for supplying said output DC voltage to said load.

7. The power converter apparatus according to claim 6, wherein said detected value indicative of converted electrical power comprises a detected value of said DC voltage and said command value indicative of a required level of converted electrical power comprises a command value of said output DC voltage.

8. The power converter apparatus according to claim 1, wherein said power converter apparatus is adapted to be installed in a motor vehicle.

\* \* \* \* \*